No. 821,860. PATENTED MAY 29, 1906.
O. COLBORNE & F. DEUERLING.
PIE CRUST ROLLING MACHINE.
APPLICATION FILED DEC. 22, 1904.
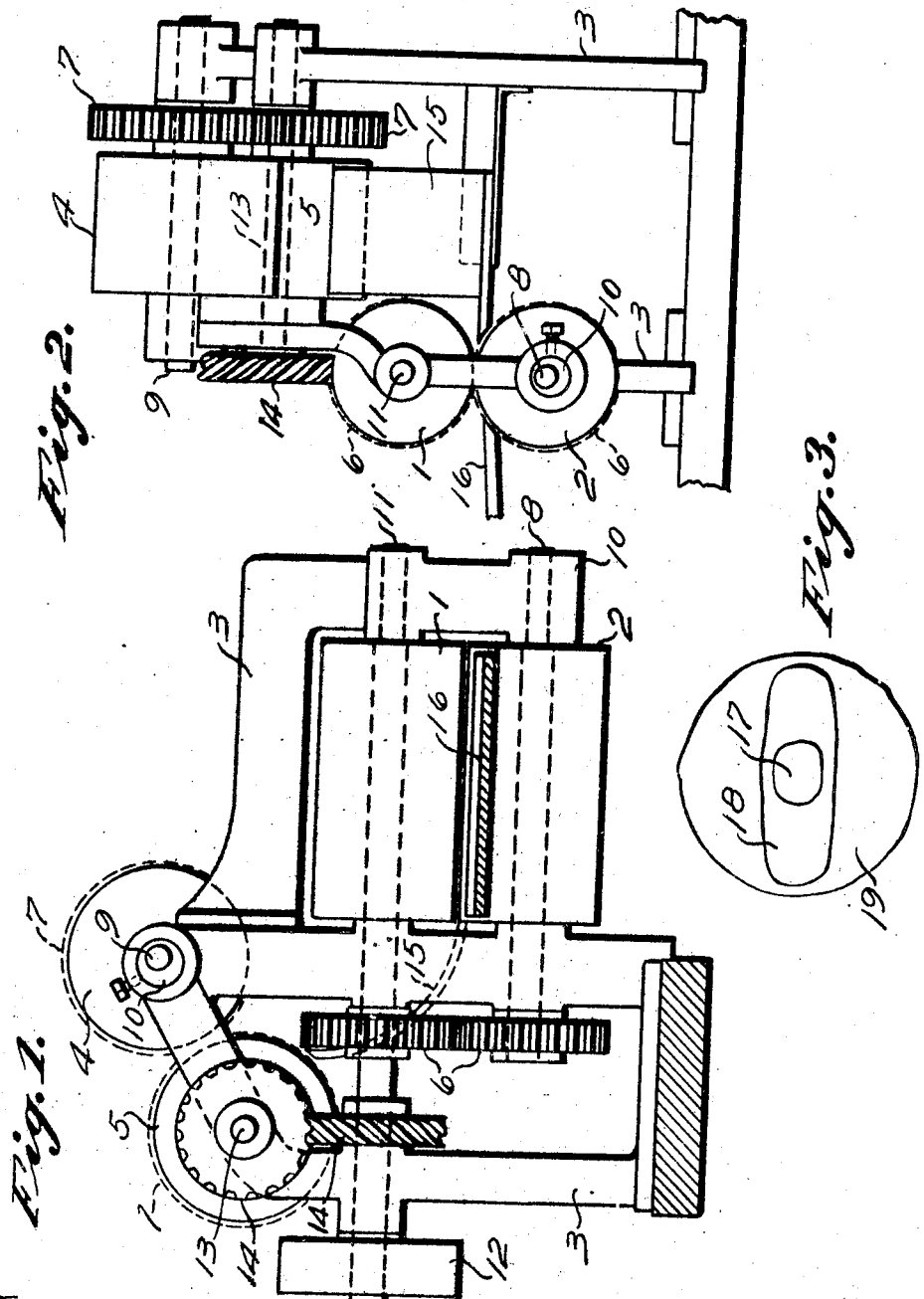

UNITED STATES PATENT OFFICE.

OLIVER COLBORNE AND FRED DEUERLING, OF CHICAGO, ILLINOIS; SAID DEUERLING ASSIGNOR TO SAID COLBORNE.

PIE-CRUST-ROLLING MACHINE.

No. 821,860.

Specification of Letters Patent.

Patented May 29, 1906.

Application filed December 22, 1904. Serial No. 237,987.

*To all whom it may concern:*

Be it known that we, OLIVER COLBORNE and FRED DEUERLING, citizens of the United States of America, and residents of Chicago, in the county of Cook and State of Illinois, have invented certain new and useful Improvements in Pie-Crust-Rolling Machines, of which the following is a specification.

Our invention relates to pie-making machinery; and its main object is to provide simple, inexpensive, and improved mechanism for rolling plastic material, such as dough, into thin and substantially circular layers, as for a pie-crust. We accomplish this object by the device shown in the accompanying drawings, in which—

Figure 1 is an end elevation of a pie-machine; constructed according to our invention. Fig. 2 is a front elevation of the same. Fig. 3 is a plan showing superimposed upon each other the successive outlines assumed by a mass of material during its passage through the device shown in Figs. 1 and 2.

In the construction shown in the drawings, a pair of horizontally-disposed cylindrical rollers 1 and 2 are journaled one above the other in the supporting-frame 3. A second pair of rollers 4 and 5 are mounted in the frame on parallel horizontal axes disposed at right angles to the axes of the rollers 1 and 2 and a considerable distance above said rollers. The rollers are all rigid on their shafts, and the rollers in each pair are geared together by the gears 6 and 7. The shaft 8 of the roller 2 and the shaft 9 of the roller 4 are journaled in eccentric bearings 10 to permit the rollers to be adjusted relatively of each other. The shaft 11 of the roller 1 is extended beyond the frame 3 at one end and carries a pulley 12, to which power is supplied by means of a belt. (Not shown in the drawings.) The shaft 11 is geared to the shaft 13 of the roller 5 by means of a pair of spiral gears 14. The gears 6 and 7 are formed with teeth of suitable shape to permit of the desired degree of adjustment between the respective sets of rollers. Extending between the two sets of rollers is a suitably-inclined platform or chute 15, having its upper or guiding surface so arranged that a mass of dough after passing the upper pair of rollers 4 and 5 will slide to a position of close proximity to the space between the lower pair of rollers and with its elongated dimension parallel with said lower rollers. The guiding-surface 15 is substantially horizontal along the lower set of rollers and extends into and along the trough of said rollers, so that the material will be brought to rest in the proper position for being pushed sidewise between the lower rollers. A receiving-platform 16 is arranged on the opposite side of the rollers 1 and 2 to receive the material after the same has passed said rollers.

The operation of the device shown is as follows: The space between the rollers 1 and 2 is first adjusted by means of the eccentric-bearings to a width equal to the desired thickness of the pie-crust, while the rollers 4 and 5 are spaced considerably farther apart, the proper spacing being determined by experiment and depending somewhat upon the shape of the mass of material before delivery to the upper rollers. When it is desired to form a pie-crust, a globular mass of dough, which in plan might be represented by the line 17 in Fig. 3, is dropped into the space between the rollers 4 and 5. The rotation of the rollers 4 and 5 draws the mass of dough through said space and delivers it upon the guiding-surface 15. The sheet of dough now has a somewhat elliptical outline, as shown at 18 in Fig. 3, the longest dimension being transverse to the rollers 4 and 5. It then slides down the inclined guiding-surface to a position opposite the rolls 1 and 2, and a slight push by the operator causes the sheet of dough to pass through the rolls 1 and 2 in the direction of its shortest diameter. The rolls 1 and 2 cause an elongation of the piece at right angles to that caused by the rolls 4 and 5, and the dough when delivered upon the platform 16 is approximately the shape shown by the outline 19. The slabs of dough are then slid by the operator from the platform 16 upon pie-tins supported by a suitable conveyer extending below the roller 2, but not shown in the drawings.

It will be seen that some of the details of the construction shown may be altered without departing from the spirit of our invention.

What we claim as our invention, and desire to secure by Letters Patent, is—

1. A device of the class described, comprising a frame; a pair of opposed rollers journaled in said frame and geared to rotate in opposite directions and adapted to elongate a mass of plastic material passing between; a second pair of opposed rollers journaled at right angles to the first pair and similarly geared; and a stationary guiding-surface in the frame, extending from the first pair of rollers into and along the trough of the second pair of rollers, for conveying material from the first pair of rollers to the second, said second pair of rollers being adapted to elongate the mass of material in a direction at an angle to the elongation effected by the first pair, substantially as described.

2. A device of the class described, comprising a frame; a pair of opposed rollers journaled in said frame and geared to rotate in opposite directions and adapted to elongate a mass of plastic material passing between; a second pair of opposed rollers journaled at right angles to the first pair, similarly geared, and located a considerable distance below the said first pair of rollers; and an inclined stationary guiding-surface extending from the first pair of rollers into and along the trough of the second pair of rollers, for causing material, after passing between the first rollers, to slide to a position for delivery to the second rollers, to be elongated in a direction transverse to the elongation effected by the first rollers, substantially as described.

3. A device of the class described, comprising a frame; a pair of opposed rollers journaled on parallel axes and spaced apart, said rollers being geared together to rotate in opposite directions for elongating a mass of plastic material passed between them; a second pair of opposed rollers spaced more closely together and similarly geared together; and a stationary guiding-surface extending from the first pair of rollers into and along the trough of the second pair of rollers and adapted to receive material, delivered from said first set of rollers, and guide the material into position for delivery to the second set of rollers, to be elongated in the same plane but at an angle to the elongation effected by the first rollers, substantially as described.

4. A device of the class described, comprising a frame, a pair of parallel horizontally-disposed shafts journaled in said frame one above the other, gears connecting said shafts for driving the same in opposite directions, a roller mounted on each of said shafts, said rollers having their peripheries opposed to each other and adapted to elongate a mass of plastic material passed between, a second pair of parallel horizontally-disposed shafts journaled in said frame below and at an angle to the first pair of shafts, said second pair of shafts being geared together and having thereon a pair of rollers having their peripheries opposed to each other for elongating plastic material passed between, a pair of spiral gears connecting the shaft of one of said first pair of rollers with one of the shafts of said second pair of rollers, and an inclined stationary guiding-surface extending from the first pair of rollers into and along the trough of the second pair of rollers and adapted to receive the material passed between said first pair of rollers and slide the same to said second pair of rollers in such manner as to cause the material to be elongated in two directions to form a flat disk.

Signed at Chicago this 17th day of December, 1904.

OLIVER COLBORNE.
FRED DEUERLING.

Witnesses:
 EUGENE A. RUMMLER,
 RUDOW RUMMLER